United States Patent [19]
Thompson et al.

[11] Patent Number: 5,372,109
[45] Date of Patent: Dec. 13, 1994

[54] EXHAUST MODULATOR

[75] Inventors: Derek Thompson, North Hykham; Robert G. Baines, Burn, both of United Kingdom

[73] Assignee: WABCO Automotive (UK) Limited, Warwickshire, United Kingdom

[21] Appl. No.: 962,188

[22] PCT Filed: Jul. 1, 1991

[86] PCT No.: PCT/GB91/01068
 § 371 Date: Dec. 23, 1992
 § 102(e) Date: Dec. 23, 1992

[87] PCT Pub. No.: WO92/00445
 PCT Pub. Date: Jan. 9, 1992

[30] Foreign Application Priority Data
Jun. 29, 1990 [GB] United Kingdom ............ 9014486.6

[51] Int. Cl.⁵ ............................................... F02D 9/06
[52] U.S. Cl. ........................................ 123/323; 60/324
[58] Field of Search ........................ 123/323; 60/324; 137/599; 251/212

[56] References Cited
U.S. PATENT DOCUMENTS

| | | | |
|---|---|---|---|
| 3,234,924 | 2/1966 | May ........................... | 123/323 |
| 4,682,674 | 7/1987 | Schmidt ..................... | 60/324 X |
| 4,707,987 | 11/1987 | Atkin ......................... | 123/323 X |
| 4,750,459 | 6/1988 | Schmidt ..................... | 123/323 |

FOREIGN PATENT DOCUMENTS

| | | | |
|---|---|---|---|
| 2212857 | 7/1974 | France . | |
| 3529767 | 2/1987 | Germany . | |
| 58-158333 | 9/1983 | Japan ........................ | 123/323 |
| 59-158350 | 9/1984 | Japan ........................ | 123/323 |
| 604777 | 7/1948 | United Kingdom . | |
| 2063998 | 6/1981 | United Kingdom .......... | 123/323 |
| 731003 | 4/1980 | U.S.S.R. ..................... | 123/323 |
| 1502866 | 8/1989 | U.S.S.R. . | |

OTHER PUBLICATIONS

Patent Abstracts of Japan, vol. 9, No. 187 (M–401) [1910], Aug. 1985, abstract of JP, A, 6053630.
Patent Abstracts of Japan, vol. 9, No. 7 (M–350) [1730], Jan. 1985, abstract of JP, A, 59158325.

Primary Examiner—Tony M. Argenbright
Attorney, Agent, or Firm—Meltzer, Lippe, Goldstein, Wolf, Schlissel & Sazer

[57] ABSTRACT

An exhaust modulator in or to be fitted in the exhaust system of an engine, having a body defining a flowpath therethrough for engine exhaust gases, a gate in the exhaust flowpath movable between an open and a closed position, one or more bleed flowpaths communicating between opposite sides of the gate, and a flow control mechanism. The mechanism is responsive to one or more operating parameters to control the flow of exhaust gases along the one or more bleed flowpaths so as to limit the back pressure applied to the engine to different predetermined levels as required for operation of the modulator in selected modes.

19 Claims, 7 Drawing Sheets

EXHAUST MODULATOR

This invention relates to an exhaust modulator, in particular for use in the exhaust system of a commercial diesel engine vehicle.

Devices known as 'exhaust modulator valves' can be fitted into the vehicle exhaust system, which by generating a back pressure can assist the vehicle in braking, assist in cab heating by giving a faster engine warm up, or assist in exhaust emission control.

In general, the greater the back pressure generated the more effective the braking effect becomes. But the maximum level of back pressure generated must be held at a level conducive to the engine, depending upon the loads generated by the valve springs for example.

To limit the back pressure, the exhaust brake gate, normally a butterfly valve or a sliding gate must either be locked into a position which is almost closed, allowing some exhaust gas to escape or have one or more bleed holes formed in the butterfly or sliding gate. It is usual in practice to drill a hole or holes, (the latter method), and allow the butterfly or gate to sit in a fully closed position.

The leakage rate is fixed by the size and number of holes in the butterfly and is dictated by the maximum allowable back pressure when the engine is running at the higher speeds and the flow of exhaust gas through the exhaust brake is at its maximum.

It follows that at lower engine speeds, especially in the normal driving range the 'bleed holes' in the butterfly or gate are larger than is necessary to reach the maximum back pressure at these lower speeds.

U.S. Pat. No. 4,682,674 discloses an exhaust modulator or exhaust-type engine suppressor in which the maximum back pressure imposed thereby is limited by means of a pressure-relief valve operable to admit flow of exhaust gases along a bleed flowpath only when a prescribed back pressure is reached. The valve is spring loaded so as to open by an amount which varies depending upon the amount by which the prevailing back pressure exceeds the prescribed limit.

An exhaust modulator for use in cab-heating or emission control is required to operate at low engine speeds and hence low exhaust gas flows, whereas for exhaust braking the engine is normally operating a high speed and exhaust gas flow rates, the maximum permissible back pressure being relatively high in the latter case.

One object of the present invention is to provide an exhaust modulator suitable for use in various modes, more particularly in a cab-heating and/or emission control mode as well as in an exhaust braking mode.

In accordance with the present invention, we propose an exhaust modulator having means for controlling the flow of exhaust gases along one or more bleed flowpaths to achieve different predetermined levels of back pressure imposed upon the engine, as required to operate in selected modes, said flow control means being operable in response to one or more sensed engine operating parameters.

In accordance with a preferred embodiment of the invention an exhaust modulator in, or to be fitted in, the exhaust system of an engine, particularly a diesel engine in a commercial vehicle comprises a body defining therethrough a flowpath for engine exhaust gases, a gate in the exhaust flowpath, one or more bleed flowpaths communicating between opposite sides of the gate and flow control means operable in use, in response to one or more sensed engine operating parameters, to control the flow of exhaust gases along the said one or more bleed flowpaths so as to limit the back pressure applied to the engine to different predetermined levels as required for operation of the modulator in selected modes.

Thus, the flow of exhaust gas along the bleed flowpath is variable in accordance with the operating conditions pertaining, to achieve any desired back pressure/exhaust gas flow characteristic or profile. The characteristic or profile may be varying but in the preferred embodiment is stepped between the said first and second predetermined levels, in accordance with predetermined control data or settings appropriate to or representative of the conditions prevailing or to be achieved, the type and level of sophistication of the control means being selected accordingly. For example, the control means may be directly responsive to one or more of the said operating parameters. Alternatively, an external control system responsive to sensing means and optionally programmed or programmable to vary the flow in accordance with stored data representative of a desired operating characteristic or profile may be used.

In one embodiment in which flow along the bleed flowpath or flowpaths may be regulated directly, the flow control means automatically senses the level of back pressure prevailing upstream of the gate and adjusts the effective flow area of the bleed flowpath to a point at which a desirable back pressure is reached appropriate to any engine speed and/or exhaust gas through flow.

The flow control means may comprise a valve biased toward a closed position, that is a position wherein communication via the bleed flowpath is cut off, and, further, may incorporate stop means limiting the effective flow area to a predetermined maximum value. The valve may comprise a disc biased toward and cooperating with a valve seat to shut off the bleed flow but is preferably a simple reed or flap valve covering a bleed hole and biased by virtue of its inherent resilience toward the closed position. Multiple valves arranged in parallel and having different bias stiffnesses or one valve having a stepped varying stiffness, or both in combination may be used to achieve the desired stepped characteristic or profile. The latter arrangement may be achieved using compound springs.

Another embodiment in which 'external' control is used comprises a gate in the exhaust flowpath, a bleed flowpath communicating between opposite sides of the gate, sensing means for producing signals representative of one or more operating parameters, the flow control means being responsive to said signals and operable, in use, to control flow along the bleed flowpath.

The sensing means may sense exhaust gas back pressure and in addition or alternatively one or more other parameters, for example temperature, speed, exhaust emissions and oil pressure. For example, in the cab heating mode the exhaust modulator serves to impose a back pressure on the engine to achieve faster engine warm up. By virtue of an embodiment of the invention, control of this procedure is possible by varying flow along the bleed flowpath in response to the sensed cab temperature.

Also, as the exhaust gas flow rate tends to increase with engine speed, the exhaust gas bleed flow (and hence applied back pressure) may advantageously be varied in response to an engine speed sensor.

It will be understood that external control is possible by using mechanical, pneumatic, hydraulic electric or electronic control means or any combination thereof. Clearly, the choice of systems or components thereof will depend upon the facilities and, power sources available on the vehicle and the parameters to be sensed.

As in conventional exhaust brakes, the gate is preferably a butterfly valve and may have one or more bleed holes therein to provide the bleed flowpath. Alternatively, the or each bleed flowpath may be a by-pass channel leading from one side of the gate to the other and may be formed in the exhaust brake body or fitted externally thereof or indeed, may be provided in any convenient manner. External fitting is particularly appropriate in the case of the 'external' control embodiment.

Embodiments of the invention will now be described by way of example with reference to the accompanying drawings in which.

Figure 1:
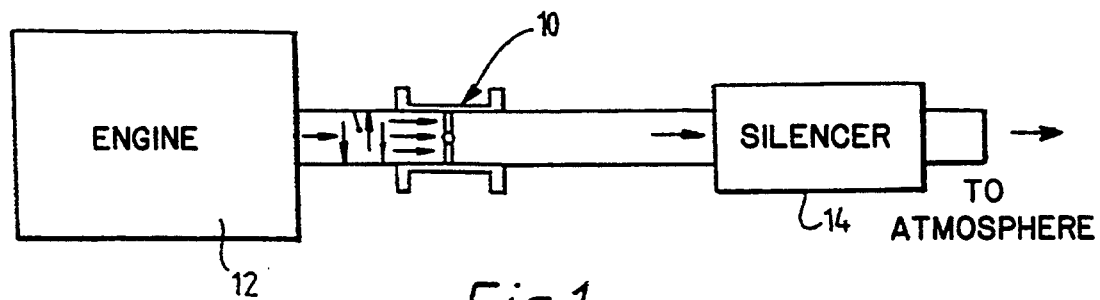
FIG. 1 shows schematically a conventional engine exhaust system.
Figure 2:
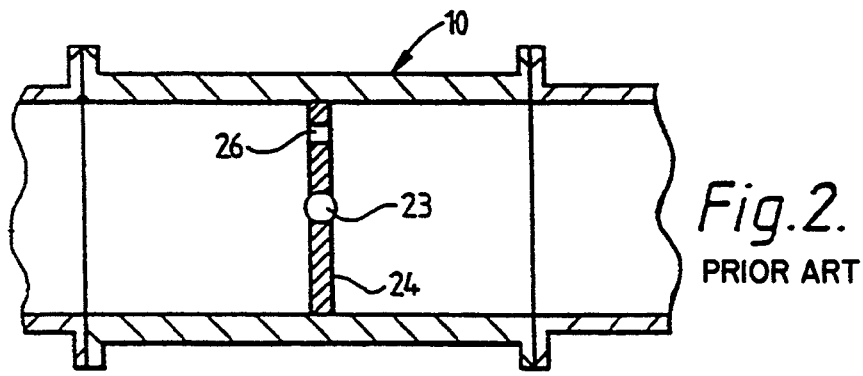
FIG. 2 shows to an enlarged scale, and in cross-section, an exhaust brake body forming part of the system of FIG. 1.

The conventional system shown in FIGS. 1 and 2 incorporates a butterfly-type modulator gate 24 mounted within a modulator housing 10 defining an internal flowpath and connected in the exhaust line between the engine 12 and silencer 14. A shaft 23 is rotatably mounted in the housing 10 and connected to an actuator (not shown) whereby the butterfly gate 24 is pivotally displaceable between an open position (not shown) and a closed position (see FIG. 2). A bleed hole 26 is provided in the gate 24 to limit the back pressure imposed upon the engine.

In the following, various forms of the exhaust modulator according to this invention are described. All of the embodiments illustrated incorporate an exhaust modulator gate of the butterfly type but would equally apply to a sliding exhaust modulator gate.

Figure 3A:
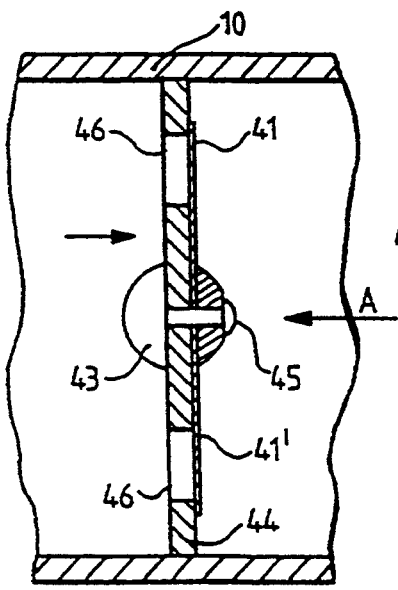
FIGS. 3A and 3B are cross-sectional views of a bleed flow control valve according to the present invention, respectively under low and medium back pressure conditions.
Figure 3C:
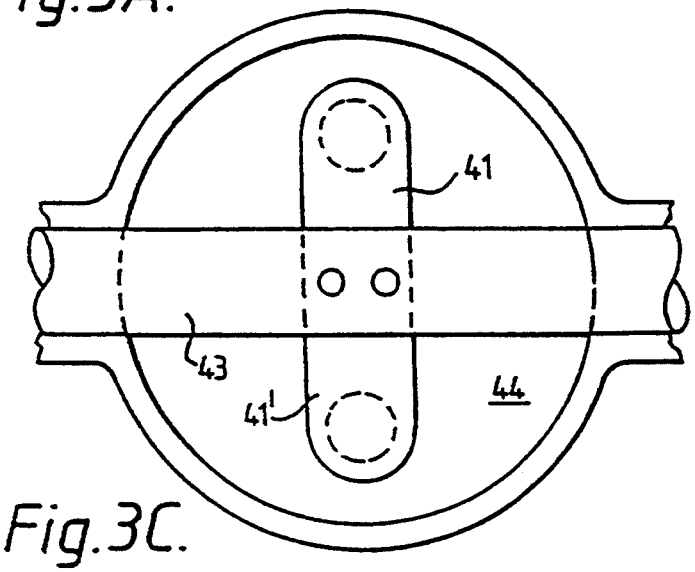
FIG. 3C is a view on arrow A in FIG. 3A.
Figure 3B:
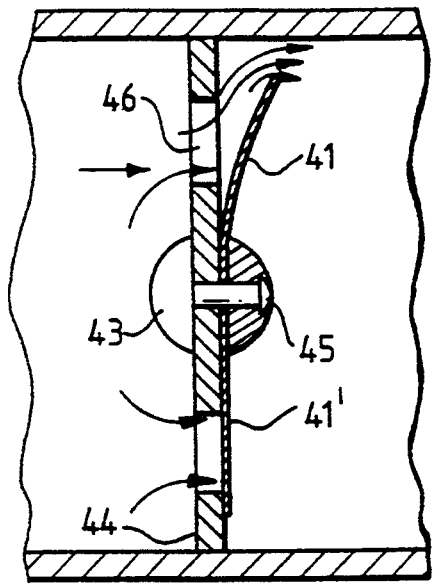

The exhaust modulator of FIGS. 3A to 3C comprises a butterfly-type gate 44 mounted in an exhaust gas flow path through the exhaust modulator housing 10, on a rotatable shaft 43 driven by an actuator (not shown) whereby the gate 44 can be opened or closed, to impose back pressure upon the engine when required for purposes of cab-heating or emission control or for exhaust braking. To limit the imposed back pressure two bleedholes 46 are formed in the butterfly gate 44, these being covered by strip-like reeds 41 and 41" attached to the shaft 43 by fixing screws or rivets 45, to prevent the flow of exhaust gas through the bleed holes 46 and thus causing back pressure to increase on the upstream side of the gate 44.

The reeds 41 and 41' have different stiffnesses selected such that, the reed valve 41 opens to permit exhaust gas to flow downstream through the bleed hole 46 when the maximum desirable pressure level appropriate to the cab-heating or emission control operating mode (i.e. low engine speed/low exhaust gas flows) is reached. Reed 41', however, remains closed.

After use for this purpose, it is usual to operate the actuator (not shown) to open the gate, so that the engine continues to run in the usual manner.

When exhaust braking is required, this normally occurring at high engine speeds and high exhaust gas flows, the actuator (not shown) is operated to close the gate and, as in the cab-heating mode, back pressure builds up but more rapidly. The reed 41 will open almost as soon as the valve is closed, permitting limited leakage through the bleed hole 46 insufficient to prevent an increase in back pressure which further increases up to the desired maximum determined by the stiffness of the second reed 41' which then opens providing an increased effective bleed flow path area; the total of the cross-sectional areas of the two holes 46.

The exhaust modulator of FIGS. 3A to 3C provides a stepped back pressure/engine exhaust gas flow profile enabling effective and efficient operation of the modulator, either in a cab-heating or emission control mode or in an exhaust brake mode as required.

Figure 4:
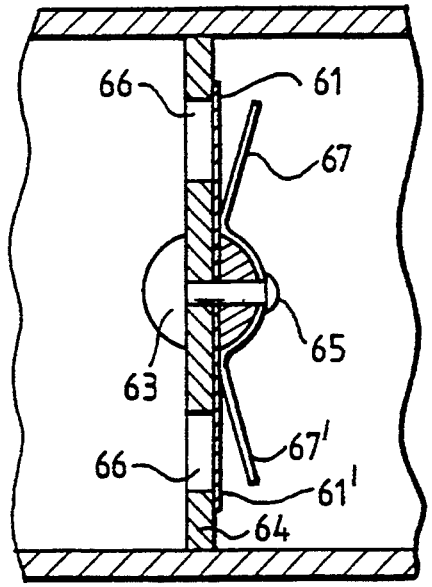
FIG. 4 is a view similar to FIG. 3A, of an exhaust modulator including variable orifice limit stops.

FIG. 4 shows a similar modulator having two reeds 61 and 61' of different stiffness but fitted with reed stops 67 and 67' respectively which can be set or adjusted as required to limit opening of the reed more than is desirable should the unit be fitted to an engine with an exhaust gas flow greater than the reed's design specification, or more importantly to limit the effective flow area of each bleed flowpath, enabling fine adjustment of the stepped characteristic or profile to suit a particular installation.

Figure 5A:
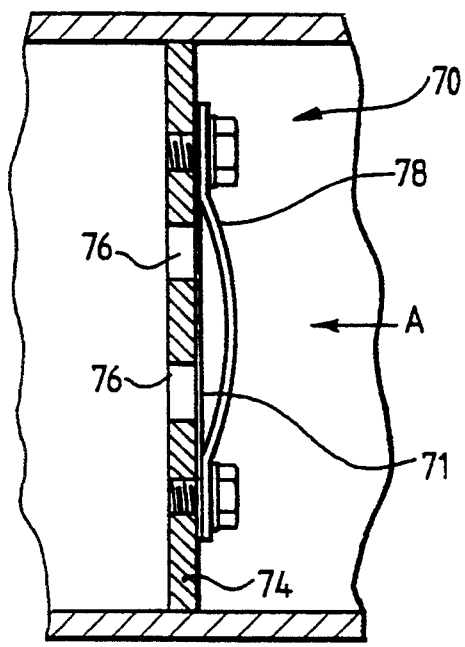
FIGS. 5A to 5C are views similar to FIGS. 3A to 3C but of a modified exhaust modulator incorporating reed straps.
Figure 5B:
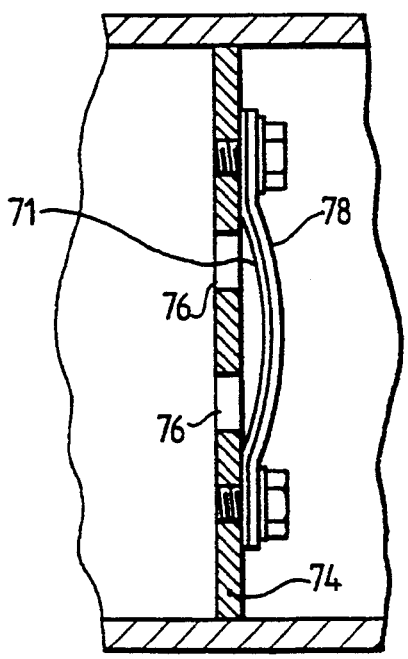
Figure 5C:
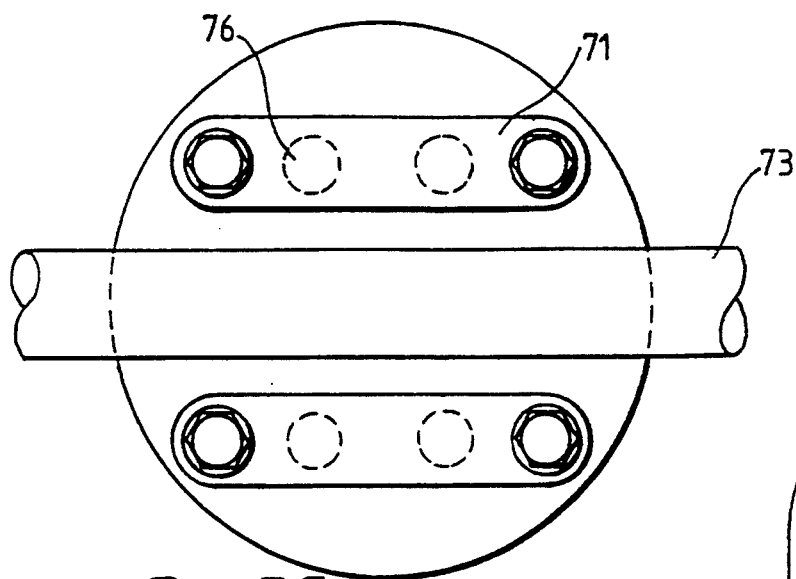

A sliding reed arrangement is used in the exhaust brake illustrated in FIGS. 5A to 5C. It has two reeds 71 one of which is significantly stiffer than the other. Each reed 71 and a strap 78 overlying the reed 71 are clamped at one end but the reed is allowed to slide relative to the strap 78 by means of an open-ended slot in the reed at the other. Each reed 71 covers two bleed holes 76 drilled in the butterfly 74, and as the back pressure increases the reed 71 lifts towards the concave underside of the strap 78 allowing exhaust gas to escape as illustrated in FIG. 5B.

Figure 6A:
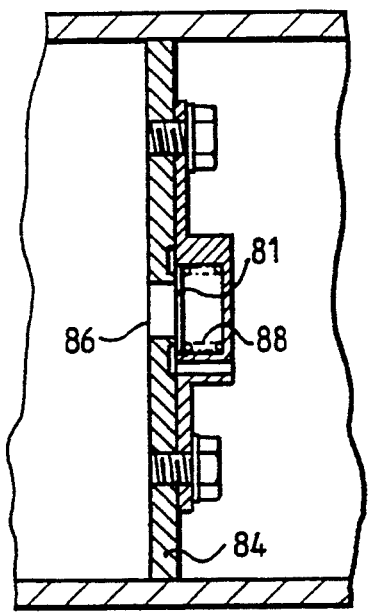
FIGS. 6A to 6C are views similar to FIGS. 3A to 3C of another embodiment of exhaust modulator.
Figure 6B:
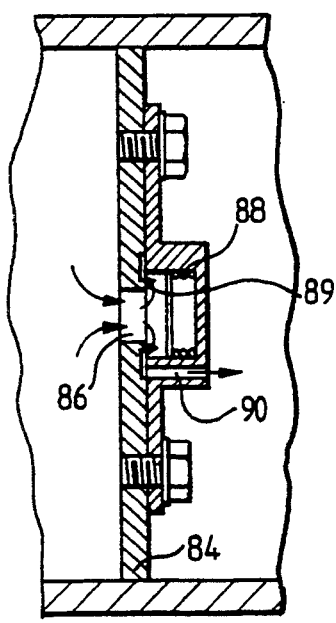
Figure 6C:
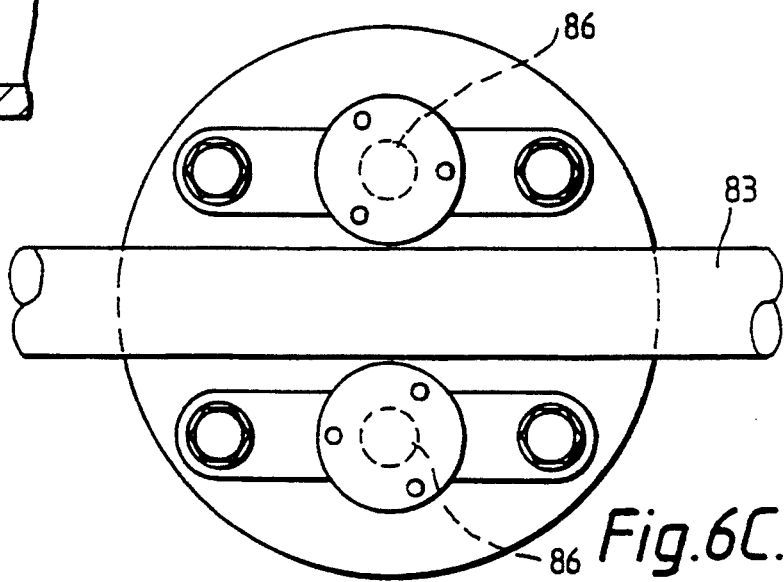

An alternative exhaust modulator valve arrangement shown in FIGS. 6A to 6C incorporates two discs 81 each covering a single bleed hole 86 and loaded by a coil spring 88 disposed within a housing attached to the butterfly 84 for displacement therewith. The disc 81 seals against the seat 89 formed in the butterfly valve 84. As the back pressure increases, the disc 81 moves away from the butterfly 84, allowing exhaust gas to escape downstream of the engine through passage 90. With increasing through flow of exhaust gas, the spring 88 becomes further compressed and the orifice area increases as shown in FIG. 6B.

Operation of the embodiments of FIGS. 5A to 5C and FIGS. 6A to 6C, is, in principle, the same as for the embodiments of FIGS. 3A to 3C. Both provide a stepped back pressure characteristic or profile enabling use of the modulator in different operating modes without loss of efficiency.

Figure 7A:
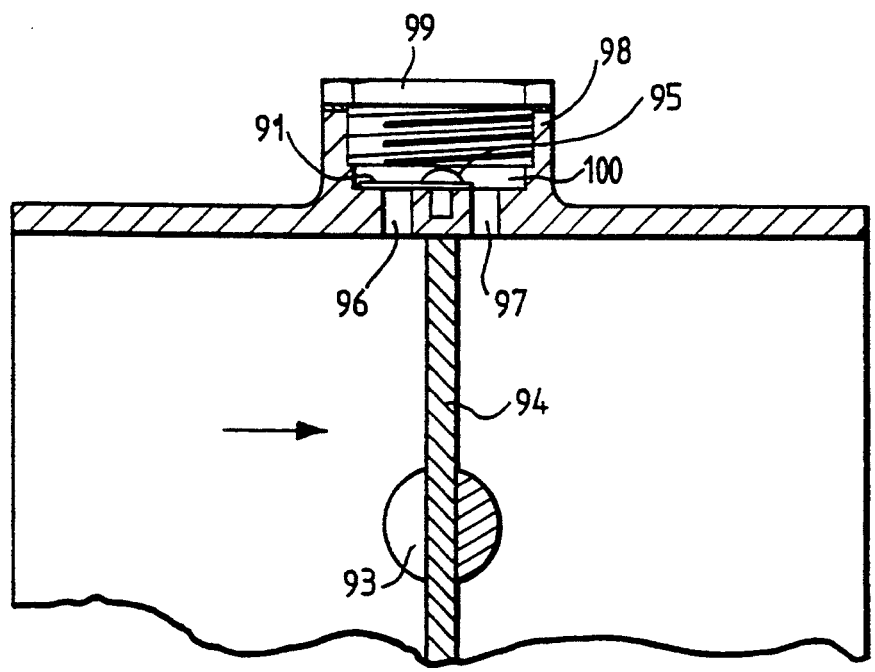
FIGS. 7A and 7B are cross-sectional views of another embodiment of exhaust modulator respectively under low and high back pressure conditions.
Figure 7B:
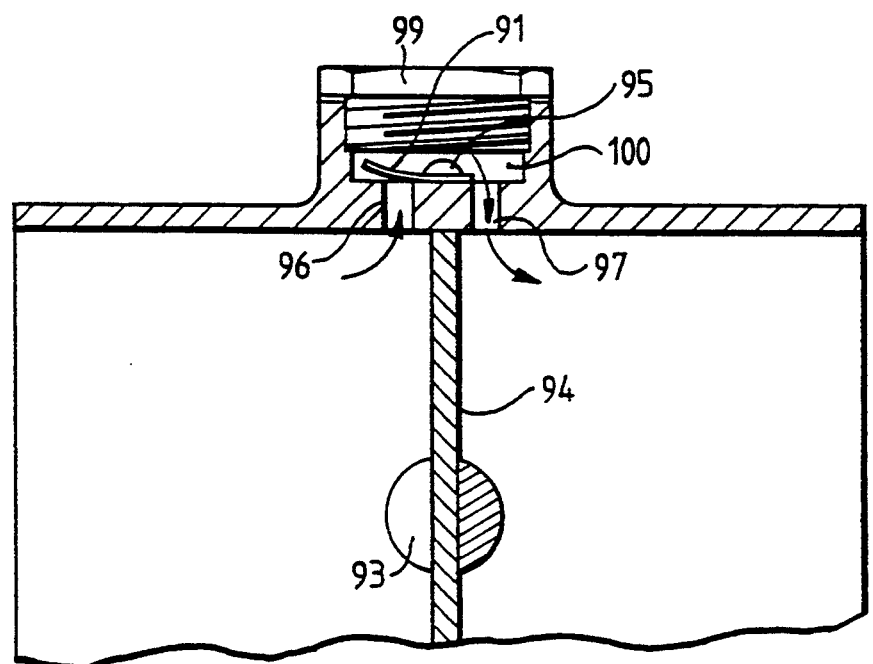

As stated above, the bleed flowpath or flowpaths may be formed in the body of the exhaust modulator and one example of such a construction is illustrated in FIGS. 7A and 7B. A boss 98 on the side of the exhaust modulator body is capped by a sealing bolt 99 to define a cavity 100 communicating between a drilling 96 on the up-stream side of the butterfly 94 and a drilling 97 on the down-stream side of the butterfly. The former drilling 96 is covered by a reed valve 91. When the volume of exhaust gas increases and back pressure increases the reed valve 91 opens as shown in FIG. 7B. The amount of reed valve 91 deflection determines the effective flow area of the bleed flowpath. Exhaust gas passing through the variable orifice moves into the area downstream of the butterfly 94 via the cavity 100 and the drilling 97.

It will be understood that as with the embodiments of FIGS. 5A to 5C and FIGS. 6A to 6B, the use of multiple flowpaths fitted with reeds of different stiffness a stepped response can be achieved.

Figure 8A:
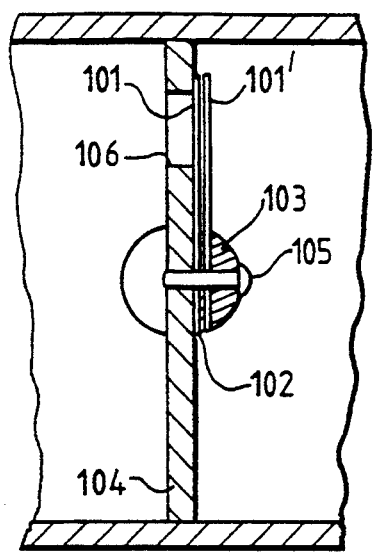
FIGS. 8A to 8C illustrate different operating states of an exhaust modulator having a double reed valve adapted to provide stepped control.
Figure 8B:
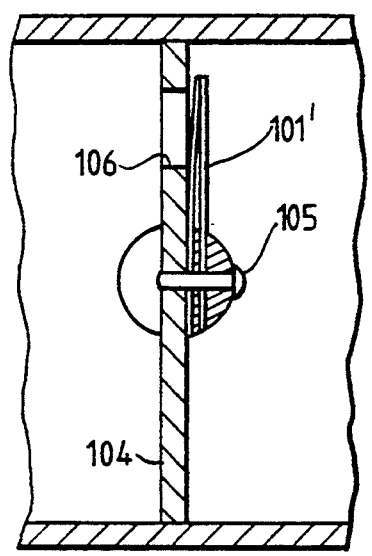
Figure 8C:
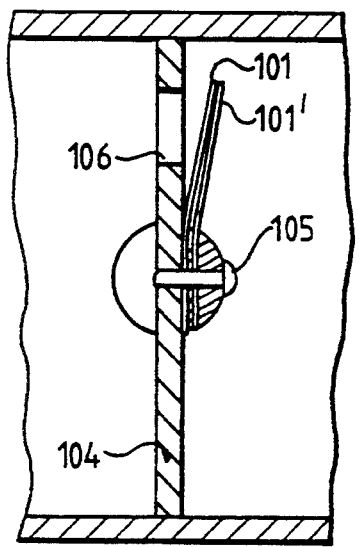

The exhaust brake of FIGS. 8A to 8C has two reeds 101, and 101', which may be identical, separated by a spacer, the three parts fitting into a slot 102 in the shaft 103, and are secured by fixing screws or rivets 105. The thickness, stiffness and other characteristics of the reeds and spacer can be varied as appropriate for a particular application. Reed 101 lies flat against the butterfly valve plate 104 covering hole 106 as shown in FIG. 8A preventing the escape of gas. As back pressure builds-up reed 101 deflects to open a bleed orifice which grows larger as the pressure increases to increase the exhaust gas through-flow, until reed 101 comes into abutment with reed 101' so that the compound stiffness is then effective. It will be evident that this arrangement produces a change in the gradient of the back pressure/exhaust gas flow characteristic, at the point of abutment of the two reeds, so that further increases in back pressure give rise to slower increase in the size of the bleed orifice, producing a stepped or quasi-stepped response characteristic. If the reed 101' is significantly stiffer than reed 101, the response will be substantially flat until the maximum back pressure in exhaust braking mode is reached.

Figure 8D:
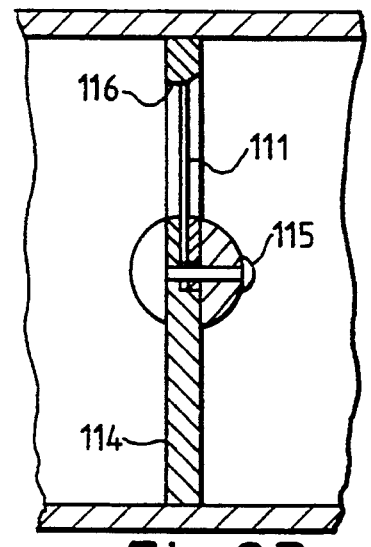
FIG. 8D and 8E illustrate a single reed valve embodiment.
Figure 8E:
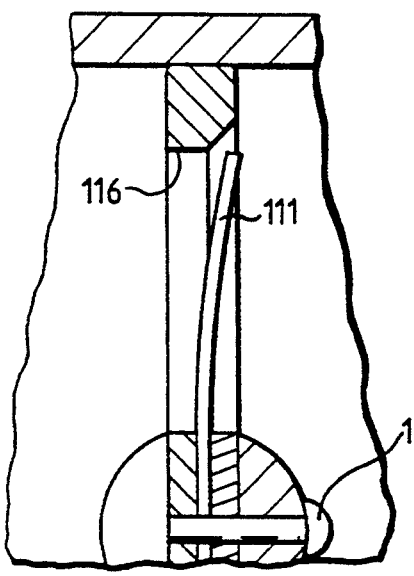

In the single reed arrangement of FIGS. 8D and 8E, the reed 111 is set centrally (of the cross-section) in the hole 116 in the butterfly valve plate 114. On its downstream side the periphery of the hole 116 is partially countersunk as illustrated such that as the back pressure increases (FIG. 8E) the size of the bleed orifice is increased continuously and more rapidly than the single reed arrangement shown in FIGS. 3A to 3C producing a less steeply curved back-pressure/exhaust gas flow characteristic.

Figure 9:
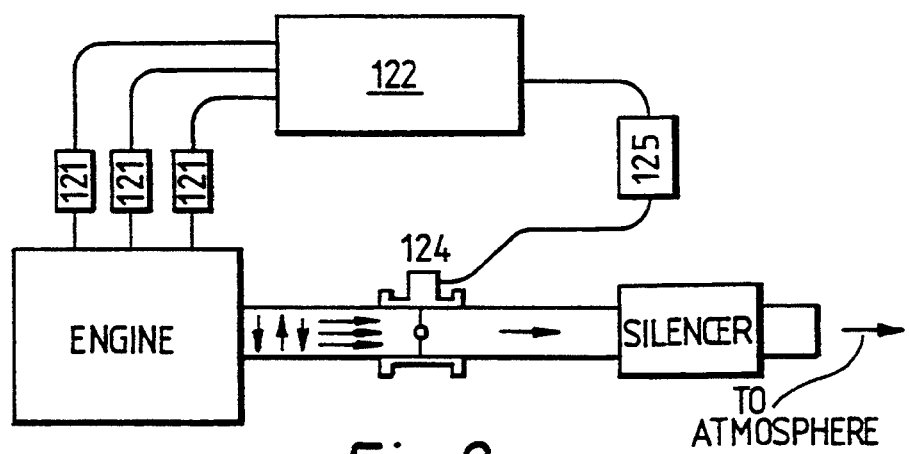
FIG. 9 is a block diagram of an exhaust modulator control system.

One example of an 'external' control system for control of an exhaust modulator is shown in FIG. 9. Detectors or sensors 121 for sensing various (in this case engine) operating parameters are connected to supply signals to a central control unit which may be a computer 122 which in turn generates a control output signal to drive an actuator 124 for the exhaust brake via a control valve 125. The type of sensors 121 used will naturally depend upon the parameters to be monitored and the actuator may be of any conventional kind depending upon whether a butterfly or sliding exhaust brake gate is used. Mechanical, hydraulic, pneumatically, vacuum or solenoid operated, or indeed any suitable actuator may be used. It may be effective to control exhaust gas flow along the bleed flowpath(s) by adjustment of the effective flow area thereof in a manner analogous to the embodiments described above or may operate in response to a pulsed signal to relieve back pressure directly; effectively operating as a closed loop control system when (one of) the sensed parameter(s) is the back pressure applied to the engine.

Figure 10:
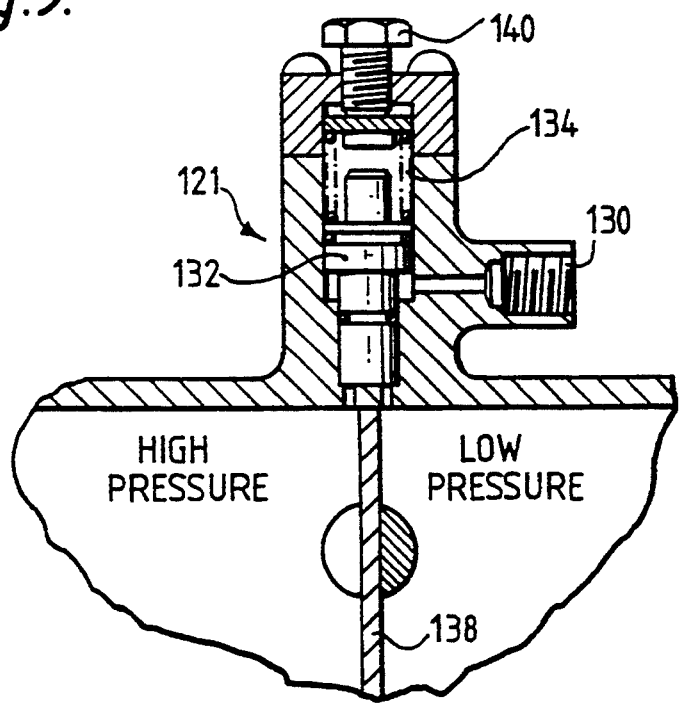
FIG. 10 is a cross-section showing the actuator of the exhaust modulator in the system of FIG. 9.
Figure 11:
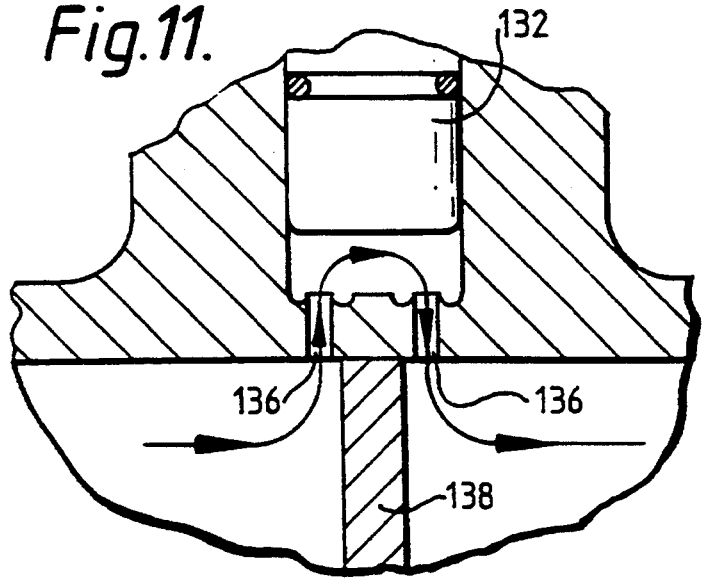
FIG. 11 shows the bleed flowpath in the exhaust modulator of FIG. 10, to an enlarged scale.

FIGS. 10 and 11 show a typical actuator serving merely to open or close the bleed flow path as necessary in accordance with a predetermined program stored in the central (computer) control unit and in response to sensed operating parameters. The actuator is built into the exhaust modulator housing and may be operable, for example, by air or hydraulic control signals to control the pressure applied to control signal port 130 to act upon a biased piston or plunger 132, causing the plunger to rise against the action of the spring 134 thus opening the bleed flowpath 136 (see FIG. 11) communicating between opposite sides of the butterfly valve plate 138 shown in the closed position. An adjusting screw 140 permits the force applied by the spring 134 to be varied.

The use of the multiple bleed flowpaths each fitted with an actuator such as described with reference to FIGS. 10 and 11 but operable under different conditions, will produce a stepped back pressure characteristic or profile.

Figure 12A:
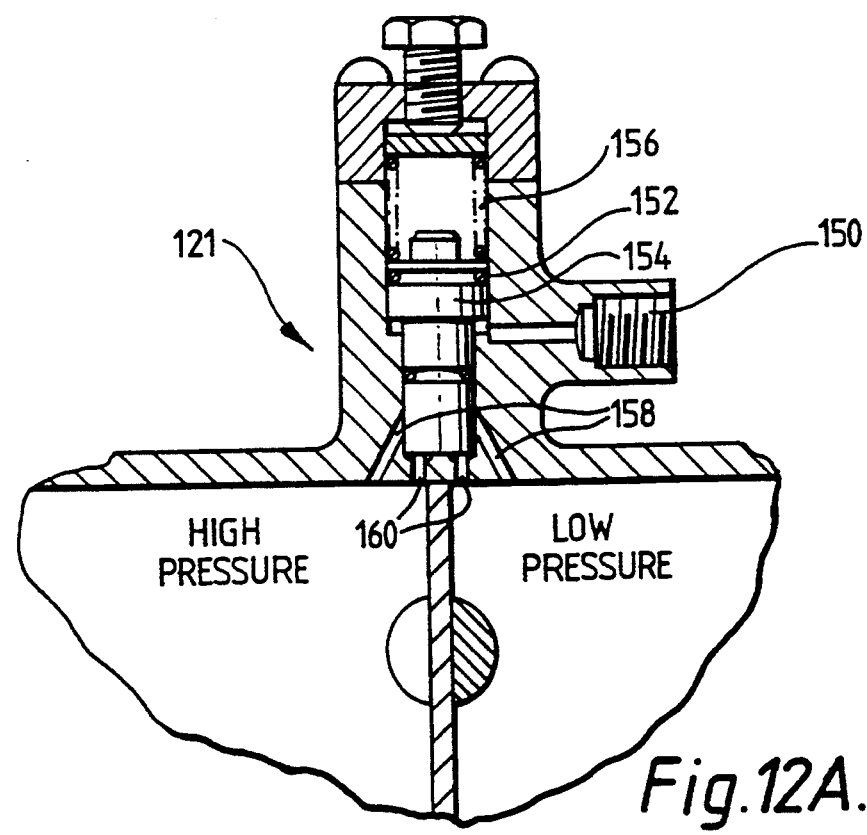
FIGS. 12A to 12C show an actuator similar to that of FIG. 10 but adapted to adjust the flow along the bleed flowpaths by varying the effective flow area thereof.
Figure 12B:
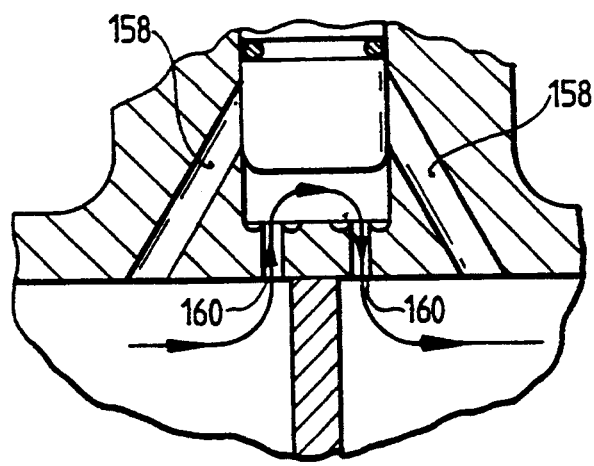
Figure 12C:
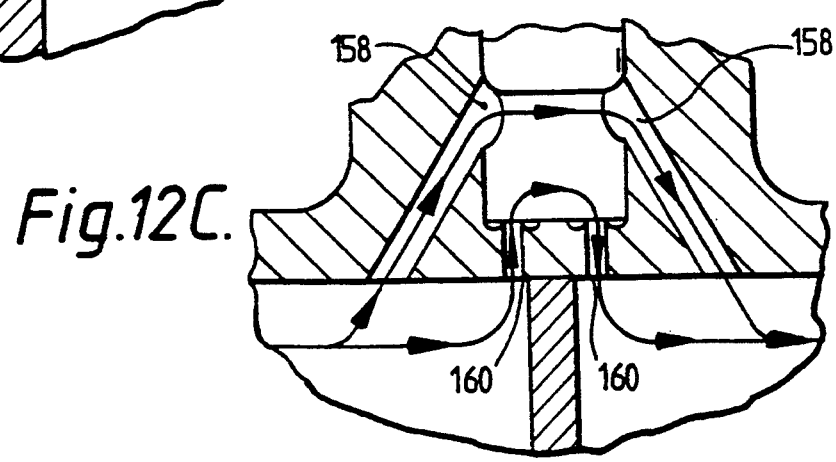

Alternatively, a stepped response can be achieved by means of an exhaust modulator having a single actuator 121 such as shown in FIGS. 12A to 12C which is built into the exhaust modulator housing and operable by a fluid control signal applied to a control signal port 150 communicating with a cylinder 152 to act upon a piston 154 biased by a spring 156. Two sets of bleed flowpaths 158 and 160 connect the cylinder 152 to opposite sides of the butterfly valve plate 162 shown in the closed position. The flowpaths 158 as illustrated have a greater effective flow area than the bleed flowpaths 160.

At low pressure, a signal from the control valve 125 (FIG. 9) lifts the piston 154 against the spring 156 to uncover and interconnect the flowpaths 160 allowing a limited bleed flow from one side of the butterfly valve to the other as shown in FIG. 12B. Under different conditions, say at higher pressure, the signal pressure is increased to the point at which the piston 154 lifts to the position shown in FIG. 12C, sufficiently to uncover and interconnect the flowpaths 158. The exhaust modulator is thus operable to achieve a stepped back pressure characteristic.

We claim:

1. An exhaust modulator for an exhaust system of an internal combustion engine, comprising a flow control means operable to control the flow of exhaust gases along at least one bleed flowpath so as to achieve different predetermined rates of increase of back pressure with increasing engine r.p.m., said flow control means being operable in response to at least one operating parameter.

2. An exhaust modulator according to claim 1 wherein the flow control means are operable in response to engine operating parameters.

3. An exhaust modulator according to claim 1 wherein the rate of flow of exhaust gas through said at least one bleed flowpath is varied to produce a relatively low back pressure to assist in engine warm up and a relatively high back pressure to facilitate engine braking.

4. An exhaust modulator according to claim 1 wherein operation of the flow control means is governed by the rate of flow of exhaust gas.

5. An exhaust modulator according to claim 1 wherein the flow control means further comprises at least one reed valve.

6. An exhaust modulator according to claim 5 further comprising a first reed valve having a certain stiffness and a second reed valve having a higher stiffness than the first reed valve.

7. An exhaust modulator according to claim 6 wherein the second reed valve is arranged to control movement of the first reed valve.

8. An exhaust modulator according to claim 6 wherein a stop is provided to limit movement of at least one of said reed valves.

9. An exhaust modulator according to claim 8 wherein the stop is in the form of a strap overlaying at least one of said reed valves.

10. An exhaust modulator according to claim 1 wherein the flow control means comprises an orifice defining a bleed flowpath and a disc biased toward said orifice to close the bleed flowpath.

11. An exhaust modulator according to claim 10 wherein more than one orifice and biased disc is provided, each disc being biased by resilient means of different stiffness.

12. An exhaust modulator according to claim 10 wherein each disc is biased by resilient means having a different preload.

13. An exhaust modulator for an exhaust system of an internal combustion engine, comprising a body defining a flowpath therethrough for engine exhaust gases, a gate in the exhaust flowpath movable between an open and a closed position and at least one bleed flowpath communicating between opposite sides of the gate, and a flow control means operable to control the flow of exhaust gases along said at least one bleed flowpath so as to limit the increase of back pressure applied to the engine to different predetermined increasing rates as engine r.p.m. increases, as required for operation of the modulator in selected modes, said flow control means being operable in response to at least one operating parameter.

14. An exhaust modulator according to claim 13 wherein said at least one bleed flowpath extends as a by-pass channel (96, 100, 97) through the body.

15. An exhaust modulator according to claim 14 wherein said at least one bleed flowpath is adapted to be closed by a valve including at least one flow port and piston movable to close the port.

16. An exhaust modulator according to claim 15 wherein bleed flowpaths having different cross-sectional areas are provided.

17. An exhaust modulator according to claim 13 including sensing means for producing signals representative of said at least one operating parameter, the flow control means being responsive to the signals to control the flow along said at least one bleed flowpath.

18. An exhaust modulator according to claim 17 wherein the sensed operating parameter is one of exhaust gas back pressure, engine temperature, vehicle cab temperature, engine speed, vehicle speed, exhaust emissions and engine oil pressure.

19. A method of operating an exhaust modulator comprising a body defining a flowpath therethrough for engine exhaust gases, a gate in the exhaust flowpath which is movable between an open and a closed position; at least one bleed flowpath communicating between opposite sides of the gate, and flow control means operable to control the flow of exhaust gases along said at least one bleed flowpath the method comprising sensing at least one operating parameter and operating the flow control means in response to said at least one operating parameter to change the rate of increase of back pressure imposed on the engine with increasing engine r.p.m.

* * * * *